UNITED STATES PATENT OFFICE.

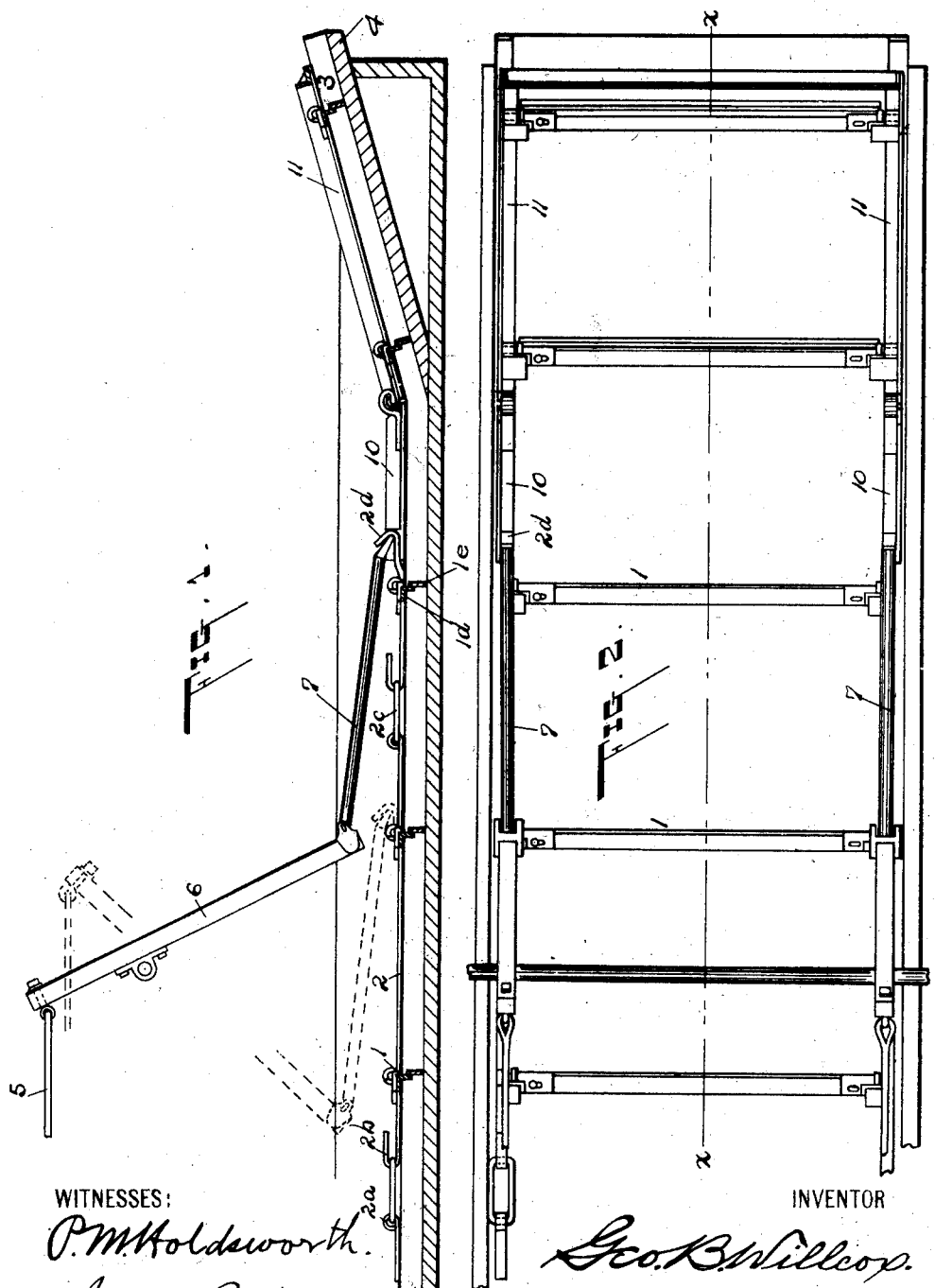

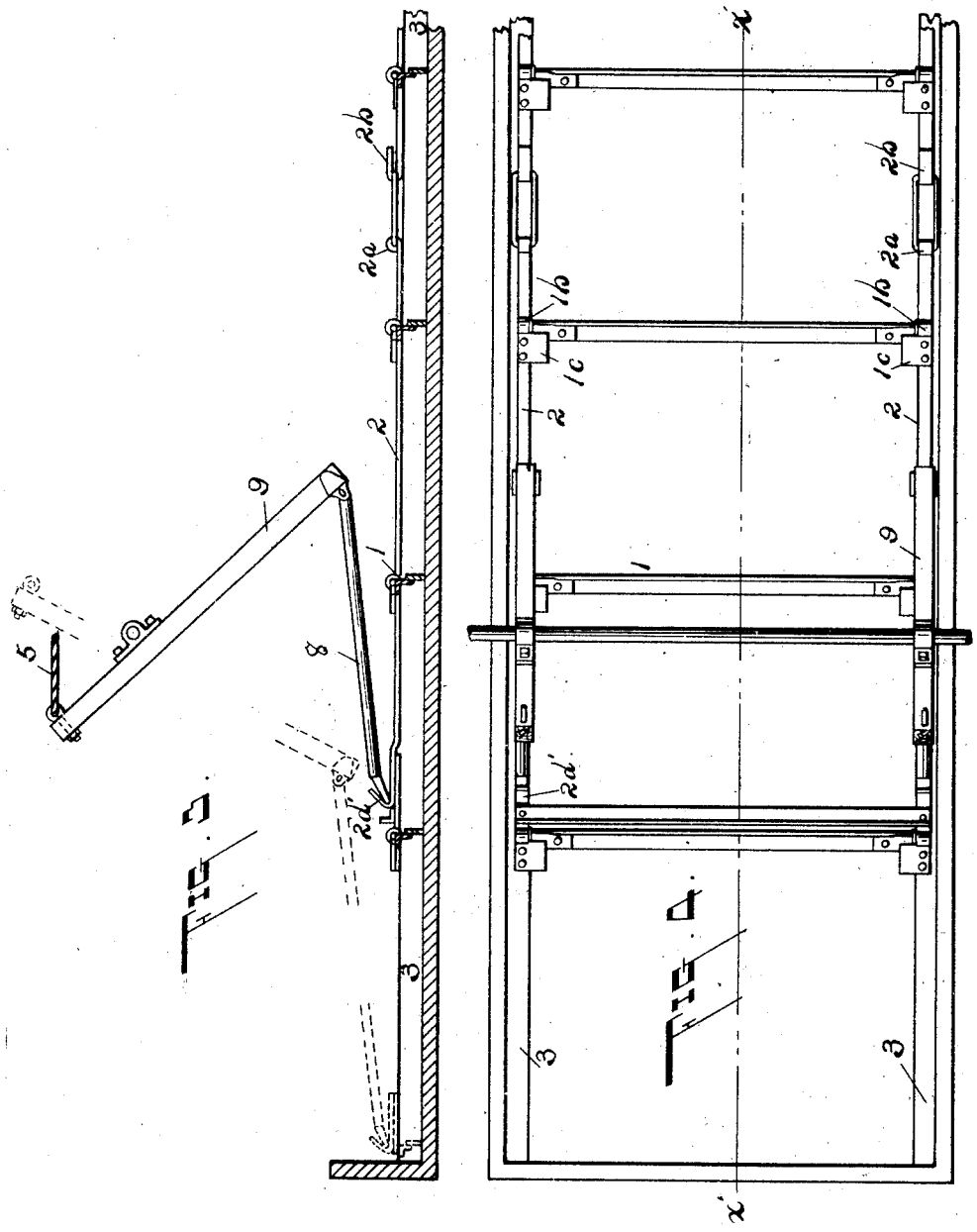

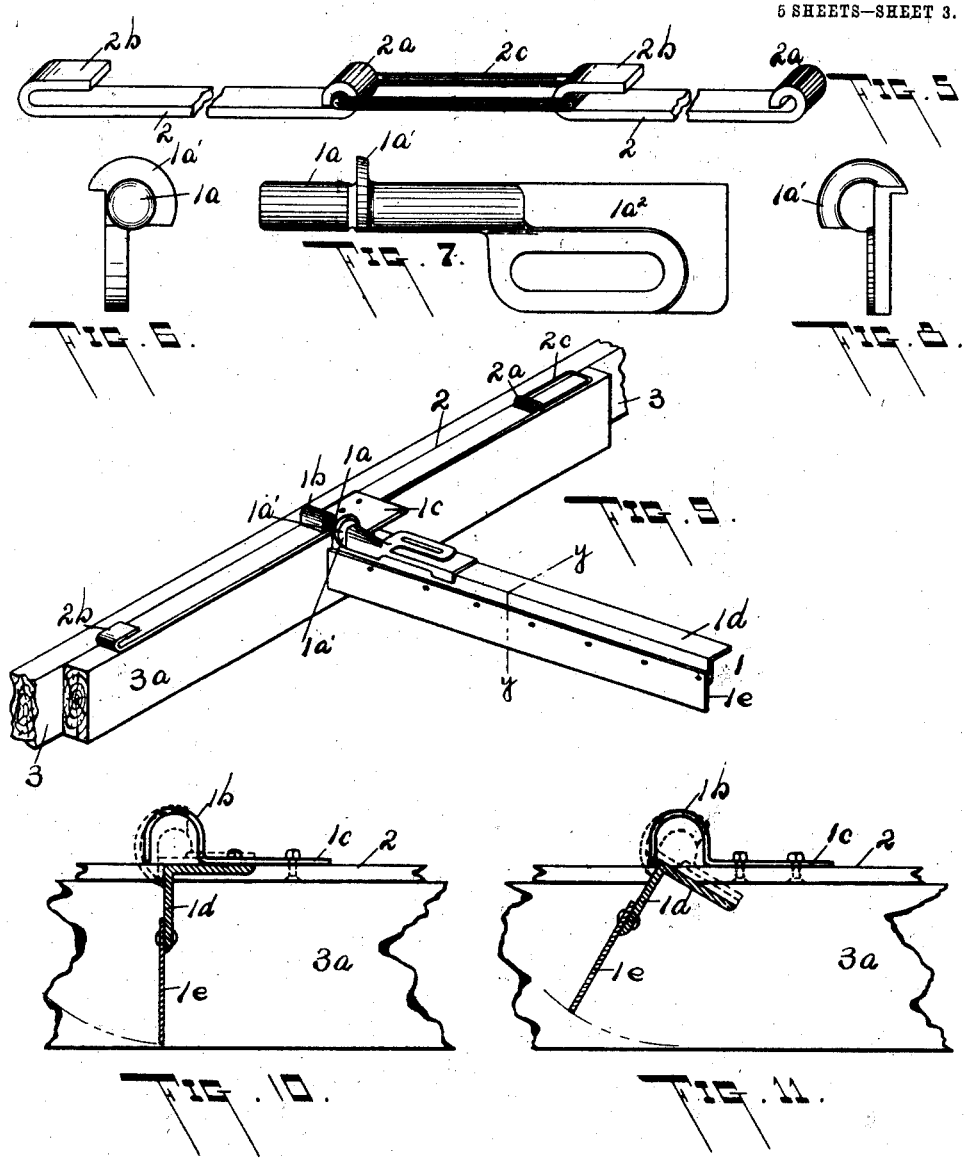

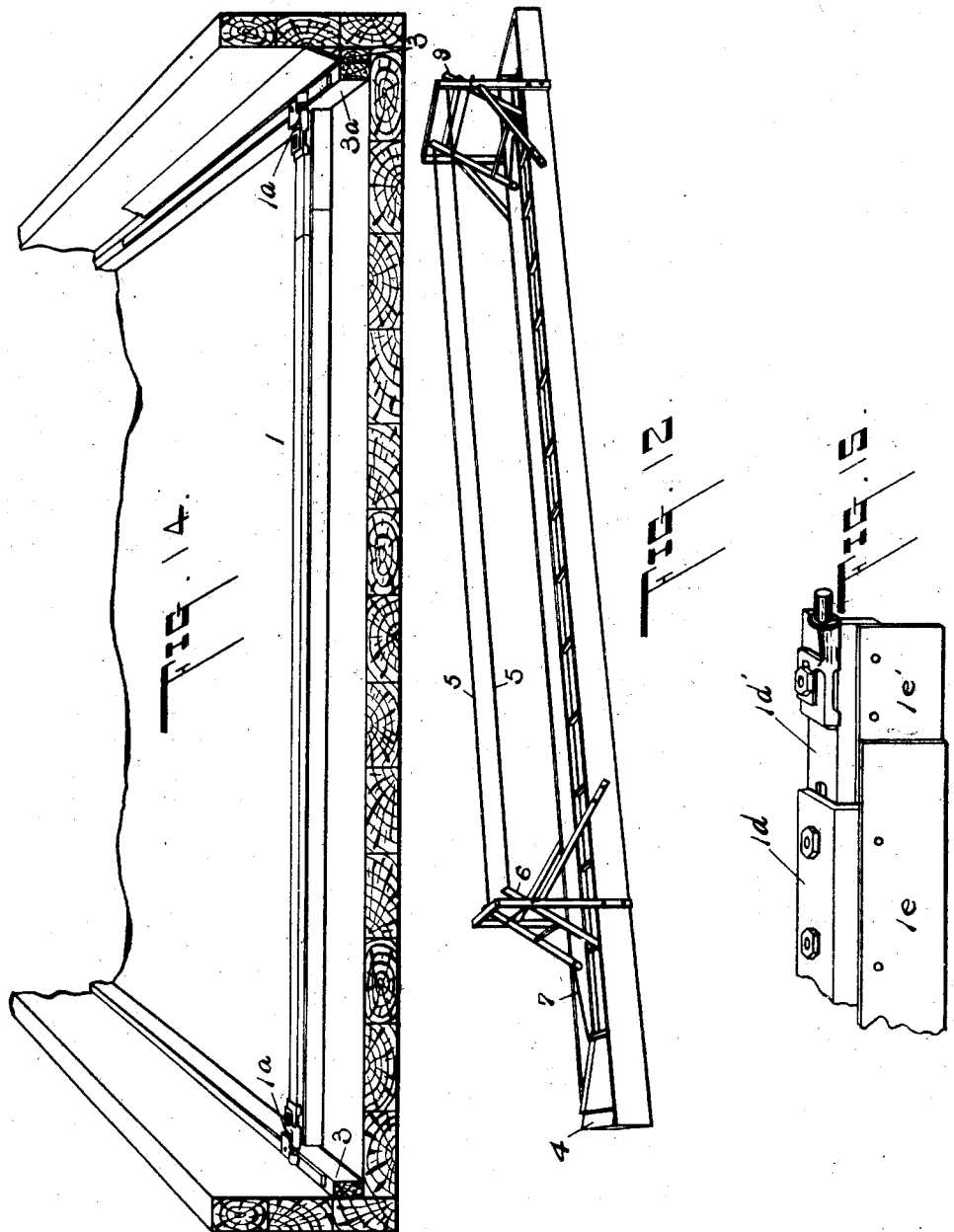

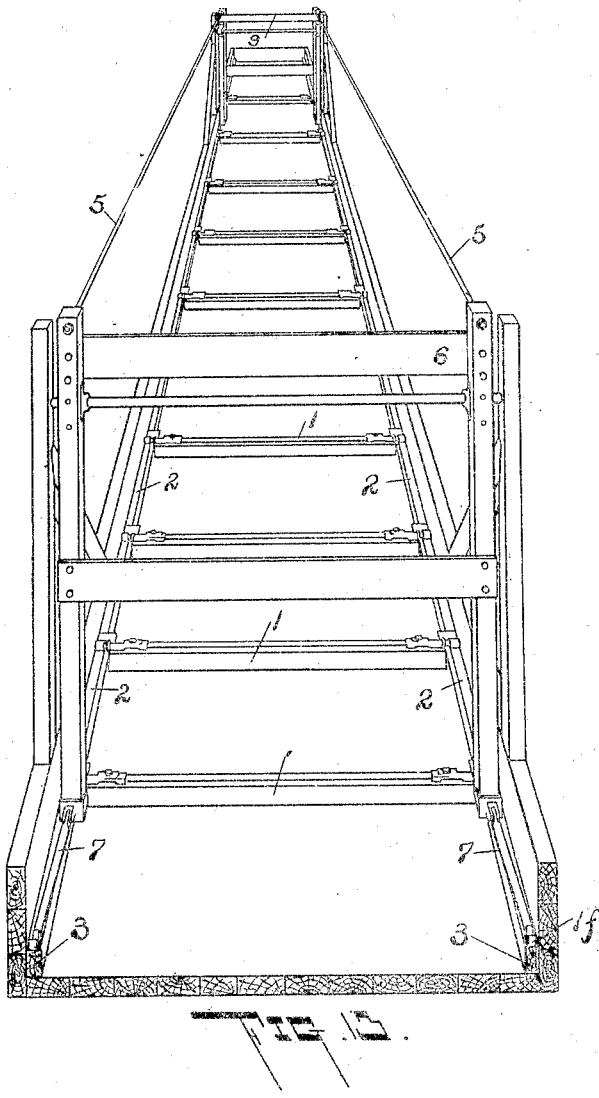

GEORGE B. WILLCOX, OF BAY CITY, MICHIGAN.

RAKING-MACHINE FOR GRAINERS.

No. 882,727.     Specification of Letters Patent.     Patented March 24, 1908.

Application filed March 2, 1903. Serial No. 145,785.

*To all whom it may concern:*

Be it known that I, GEORGE B. WILLCOX, a citizen of the United States, residing at Bay City, in the county of Bay and State of Michigan, have invented certain new and useful Improvements in Salt-Grainers; and I do hereby declare the following to be a full, clear, and exact description of the invention, such as will enable others skilled in the art to which it appertains to make and use the same.

This invention is a machine for automatically raking salt from the bottoms of grainers, or for removing other substances from the bottoms of vessels similar to salt grainers.

The invention relates more particularly to that class of rakers commonly known as reciprocating rakes or those having an intermittent or forward-and-back movement as opposed to that class of rakers having continuous forward movement.

The invention is illustrated in the accompanying drawings in which

Figure 1 is a sectional elevation of the front end of a grainer, the section being taken on the line $x$—$x$ of Fig. 2, the proportions of the parts being distorted for clearness. Fig. 2 is a top plan view of the parts shown in Fig. 1. Fig. 3 is a sectional elevation of the rear end of the grainer, the section being taken on the line $x'$—$x'$ of Fig. 4. Fig. 4 is a plan view of the parts shown in Fig. 3. Fig. 5 is a detail partly broken away of two side straps and a connecting link. Fig. 6 is a front end view of a hinge pivot. Fig. 7 is a plan view of the same, and Fig. 8 is a rear end view of the same. Fig. 9 is a detail showing the manner of mounting the scraping blades on the straps. Fig. 10 is an enlarged section on the line $y$—$y$ of Fig. 9, showing the scraping blade in its vertical position. Fig. 11 is a similar section showing the scraping blade in its feathering position. Fig. 12 is a perspective view of a grainer equipped with the raker. Fig. 13 is a longitudinal perspective view of the grainer with the front or inclined end cut away. Fig. 14 is a transverse section of a grainer showing a laterally adjustable track. Fig. 15 is a perspective view of a telescoping scraper blade.

As is clearly shown in the drawings the device consists in a series of transverse scraping blades (1) extending across and clearing the grainer bottom and pivotally supported at their ends by pulling straps (2) that extend lengthwise the grainer. The pulling straps (2) lie upon fixed tracks or guides (3) which may be of angle iron or any suitable construction, and may be carried by the grainer bottom or attached to its sides near the bottom. I have found in practice that 3"x2" soft wood capped by 2"x1" hard maple facing makes a cheap and durable track.

The pulling straps act as tension members both on the forward and back stroke and can therefore be made of any suitable light and inexpensive form or material. They may be made of flat steel bars connected end-to-end in any suitable manner to form a continuous strap but for convenience in handling and ease in assembling, I prefer to make them in sections of say ten or fifteen feet, one end of each section being bent up to form a loop ($2^a$) and the other end forming a hook ($2^b$). The loop of one is connected to the hook of the one next by a link ($2^c$), as shown in Fig. 5. The pulling straps and links together form a flat band, one at each side of the grainer near its bottom, resting on the fixed tracks and each capable of sliding as one piece back and forth thereon. The straps have ample bearing surface to prevent wearing the track on which they slide.

Housings or loops ($1^b$) having projecting flanges ($1^c$) are secured at intervals along the straps by riveting or otherwise. A projecting pin or pivot ($1^a$) is fixed to the ends of each scraper (1). The pivot rests on the side strap (2) and is loosely inclosed by the loop ($1^b$) so as to rock freely therein. The lower or bearing surface of the pivot ($1^a$) is so located relatively to the center of gravity of the scraper that the latter is nicely balanced and feathers readily on the back stroke. The scrapers (1) move freely back and forth with the straps (2), their lower edges just clearing the grainer bottom, thereby moving the salt crystals forward step-by-step from one blade to the next until they are delivered over the incline (4) at the end of the grainer.

The pivots ($1^a$) and the scrapers (1) may be made of any suitable construction, but the forms illustrated in Figs. 6 to 11 give excellent results. In these preferred forms the scrapers (1) are built up of a steel angle ($1^d$) to the lower flange of which is riveted a flat blade ($1^h$). The upper flange of the angle ($1^d$) serves three useful purposes. It gives the scraper the necessary transverse stiffness to move the load without springing—an item of considerable importance in wide grainers. The weight of its laterally projecting flange produces in the blade (1ᵉ) a natural tendency to feather, making the action of the blade exceedingly easy and preventing abrasion of the soft hot salt crystals during the back stroke. This flange also acts as a stop to hold the blade upright on the forward stroke, by engaging the projecting stop or flange (1ᶜ) of the loop (1ᵇ). On the front stroke the actuating mechanism draws the pulling straps forward simultaneously carrying the scraping blades with them, and on the back stroke the pulling force is applied near the rear end of the grainer. Any suitable mechanism can be employed to pull the strap back but I prefer in practice to use the means shown in the drawings in which (5) (5) are cables of wire strand, steel rods or other suitable material extending lengthwise the grainer and connecting the upper ends of the two swing frames (6) and (9). These frames are pivotally mounted on suitable supports so as to oscillate through a small arc. The lower ends of the forward swing frame (6) are connected by suitable means, as by thrust bars (7) (7), to the straps (2) (2). Sockets (2ᵈ) on the side straps receive the ends of the thrust bars. The lower ends of the rear frame (9) are similarly connected to the straps (2) (2) by the thrust bars (8) (8), stepped in the sockets (2ᵈ). The rear scraper can be mounted at the end of the side strap as shown in dotted lines in Fig. 3, so that the scraper will commence its stroke close to the back end of the grainer with little or no clearance and remove all the salt therefrom. A parallel motion mechanism is thus produced, its lower members being the pulling straps (2) (2) and its upper members being the tension cables (5) (5). I prefer to use two tension cables as shown in Figs. 12 and 13, but one or more than two may be used if desired. The power to move the raker back and forth may be applied to one or both of the swing frames in any suitable manner.

On the working or forward stroke the pulling straps (2) (2) are drawn forward and carrying with them the back thrust bars (8) (8), swing the lower end of the frame (9) forward and its upper end back. The cables (5) (5) pull the upper end of the frame (6) back, swinging its lower end forward. The front thrust bars (7) (7) move forward with the straps (2) (2). There is no stress in the cables due to moving the load on the forward stroke. On the back or feathering stroke the thrust bars (7) (7), swing frame (6), cables (5) (5), frame (9) and bars (8) (8) operate to draw the raker into position for a new working stroke.

The swinging movement of the frames is converted into a horizontal pull on the side straps by the forwardly extending thrust bars (7) (7), and the backwardly extending thrust bars (8) (8), while the vertical component of the thrust is utilized in yieldingly pressing the straps (2) (2) down upon the tracks (3). This yielding downward pressure of the thrust bars on the side straps, together with the tension keeps the straps normally in line like two taut strings, and although pressed snugly down upon their tracks or guides they slide lengthwise freely and easily. There is sufficient downward pressure to prevent the scrapers from lifting, yet not enough to permit them to gouge into or abrade the grainer bottom.

To deliver the salt up the incline a forwardly extending member (10) of angle or other suitable cross-section capable of transmitting endwise thrust is secured to the side straps near each thrust bar (7) and to the front end of each member (10) is pivotally secured a forwardly extending section (11) adapted to travel up the incline. Scrapers are mounted on this hinged section as is indicated in Figs. 1 and 2, to push the salt up and discharge it over the front end. I prefer to support and guide the front section (11) by extending the track (3) up the incline, facing it with steel to prevent wear, and permitting the ends of the section (11) to slide up and down thereon.

From the above description it will be seen that the side straps (2) (2) are normally held straight and parallel with each other, and unless pushed out of place by some outside force would remain so. But to prevent their being accidentally pushed out of line, I provide collars (1ᵃ′) on the pivots (1ᵃ), to bear against the housing (1ᵇ) if the strap moves in. The scraper (1) thus acts as a distance piece between the two side straps.

For longitudinal adjustment of the pivot (1ᵃ) on the scraper (1), I provide a slotted bolt hole in the flange (1ᵃ²) of the pivot (1ᵃ). New wooden grainers frequently shrink in width and have to be tightened by wedging from the outside. Lengthwise adjustment of the pivots (1ᵃ) will take care of a certain amount of such shrinkage, but to permit further adjustment without cutting the scrapers I have invented a track that is itself adjustable in width. Any suitable laterally adjustable guides may be employed but I find the following construction satisfactory. A false or removable track or guide (3ᵃ) shown in Figs. 9 and 15, is secured inside the track (3) when the raker is first installed. From time to time, as the grainer shrinks in width, the pivots (1ᵃ) are set back on the scraper until the side of the track (3ᵃ) nearly touches the end of the scrapers. The false track (3ᵃ) is then removed and the pivots (1ᵃ) extended, giving ample clearance between the track (3) and the end of the scraper. To take care of a large amount of shrinkage I sometimes make the scrapers themselves extensible. Fig. 16 shows such a construction. The transverse bar, which is of angle iron or other suitable form is cut shorter than the distance between the side straps, and is provided at one end with a telescoping extension (1$^{d'}$), preferably bolted to it, the bolt holes in one or both members being slotted to permit adjustment. The blade (1$^e$) on the member (1$^d$) overlaps the blade (1$^{e'}$) on the member (1$^{d''}$) to preserve continuity of the scraper when extended.

What I claim as my invention and desire to secure by Letters Patent, is:

1. In a raker for grainers the combination of an oscillating frame near each end of the grainer; tension cables connecting the upper ends of said frames; forwardly extending thrust bars secured to the lower end of one frame, and rearwardly extending thrust bars secured to the lower end of the other frame; a tension strap at each side of the grainer connecting the extremities of a forward and a rearward thrust bar; scraper blades transverse the grainer and pivotally supported by said straps; suitable guides supporting said side straps; and means for imparting back and forth movement to the scrapers.

2. In a salt raker operated by back and forth movement and having longitudinal tension members and scraping blades carried thereby; a pivotally supported oscillating frame near each end of the raker adapted to swing back and forth through a small arc; thrust bars connecting the lower ends of said frames to the tension members, and cables connecting the upper ends of the frames whereby tension is maintained in said tension members.

3. In a salt raker operated by back and forth movement and having longitudinal tension members and scraping blades carried thereby; a pivotally supported oscillating frame near each end of the raker adapted to swing back and forth through a small arc; thrust bars connecting the lower ends of said frames to the tension members, and means connecting the upper ends of the frames, whereby tension is maintained in said tension members.

4. In a salt raker operating by back and forth movement and having longitudinal tension members and scraping blades carried thereby; a pivotally supported oscillating frame near each end of the raker adapted to swing back and forth through a small arc; means connecting the lower ends of said frames to the raker and means connecting the upper ends of the frames whereby tension is maintained in the tension members.

5. In a raking machine having side straps and scrapers carried thereby, means for maintaining tension and yielding downward pressure in the side straps of the machine, comprising a pair of forwardly and downwardly extending bars near the front end of the raker and a pair of rearwardly and downwardly extending bars near the rear end of the raker together with means for exerting longitudinal thrust in said bars.

6. A salt raker comprising side members, feathering scrapers carried by the side members, oscillating frames located near opposite ends of the side members, and means carried by said frames adapted to impart a reciprocatory movement to the side members and maintain them constantly under tension.

7. In a salt raker a pair of swinging frames; tension cables connecting them; a back-and forth reciprocating raking mechanism comprising side members carrying scraping devices and means connecting said frames and raking mechanism whereby longitudinal tension is maintained in said members during the back-and-forth movement thereof.

8. In a raker of the class described a pair of side straps, longitudinal guides supporting the side straps; transverse feathering scrapers carried by the side straps; bars at each end of the side straps adapted to exert thrust to produce tension in the side straps and to hold them yieldingly pressed down upon the guides and means for producing thrust in said bars.

9. In a raker for grainers, a pair of side straps adapted to back-and-forth reciprocating movement; scrapers operated thereby; means at both ends of said side straps to maintain tension therein during the back-and-forth movement of said side straps and adapted to actuate the side straps on their back stroke, said actuating means being adapted to permit the side straps to travel clear to the end of the grainer near its bottom to remove the material therefrom.

10. In a raker of the class described having side straps and swinging frames; cupped sockets on the lower end of the swinging frame; bars having their upper ends engaged in said sockets; and sockets on the side straps of the raker adapted to receive the lower ends of said bars.

11. A salt raker comprising a pair of tracks, side members supported on the tracks, feathering scraper blades carried by the side members, actuating means, and elements carried by the actuating means and engaging the side members for reciprocating the latter and for pressing them yieldingly against the tracks while imparting reciprocatory motion thereto.

12. In a salt raker a pair of flat side straps, housings carried by said side straps; flanges on said housings projecting beyond the edges of said side straps; transverse scraping blades; pivots mounted on said blades to engage said housings; and flanges on said blades to engage the flanges on the housings.

13. In a raker for grainers having submerged tracks and straps sliding thereon a scraper comprising an L-shaped member extending crosswise the grainer in proximity to its bottom; pivots projecting lengthwise beyond the ends of said L-shaped member; housings carried by said straps for maintaining the pivots; and projecting flanges on said housings to engage the horizontal flange of the L-shaped member.

14. In a reciprocating salt raker, scraping blades extending transverse the grainer: pivots secured to the ends of said blades for supporting them, said pivots being adjustable lengthwise the blade.

15. In a salt raker having feathering scrapers, pivots for supporting said scrapers, each of said pivots comprising a pin adapted to project longitudinally from the end of said scraper; a collar on said pivot, and means for adjusting the pivot lengthwise the scraper.

16. In a raker for grainers, the combination with a pair of straps and means for reciprocating the same, of an angular scraper extending between the straps, the scraper comprising a vertical and a horizontal flange, and pivots projecting from the ends of the scraper substantially at the juncture of the horizontal and vertical flanges and resting upon the straps, the bearing surface of the supporting pivots being approximately in line with the center of gravity of the scraper.

17. The combination with a grainer, of a raker comprising straps extending longitudinally of the grainer and beneath the liquid level of the brine in the grainer, transversely extending feathering scrapers supported on the straps and means for applying an actuating force directly to the straps at points beneath the liquid level and in the plane of said straps.

18. A balanced scraper for salt rakers comprising an angular blade consisting of a vertical and a horizontal flange, pivots projecting from the opposite ends of the scraper, substantially at the juncture of the horizontal and vertical flanges.

In testimony whereof I affix my signature, in presence of two witnesses.

GEORGE B. WILLCOX.

Witnesses:
JAMES C. HANSON,
P. M. HOLDSWORTH.